United States Patent [19]
Keck et al.

[11] Patent Number: 5,668,901
[45] Date of Patent: Sep. 16, 1997

[54] LOW REFLECTIVITY FIBER BRAGG GRATING WITH RECTANGULAR REFLECTION FUNCTION

[75] Inventors: Donald B. Keck, Big Flats; Robert A. Modavis, Painted Post, both of N.Y.

[73] Assignee: Corning Incorporated, Corning, N.Y.

[21] Appl. No.: 601,201

[22] Filed: Feb. 14, 1996

[51] Int. Cl.$^6$ .................................................. G02B 6/34
[52] U.S. Cl. .............................................. 385/37; 359/3
[58] Field of Search .............................. 359/570, 3, 24, 359/569, 566; 385/10, 8, 37, 36, 147, 11, 12, 27, 28

[56] References Cited

U.S. PATENT DOCUMENTS

| | | | |
|---|---|---|---|
| 4,669,811 | 6/1987 | McQuoid | 350/3.7 |
| 5,066,133 | 11/1991 | Brienza | 385/37 X |
| 5,089,903 | 2/1992 | Kuwayama et al. | 359/15 |
| 5,195,161 | 3/1993 | Adar et al. | 385/129 |
| 5,218,655 | 6/1993 | Mizrahi | 385/39 |
| 5,237,576 | 8/1993 | DiGiovanni et al. | 372/6 |
| 5,257,273 | 10/1993 | Farries et al. | 372/6 |
| 5,309,260 | 5/1994 | Mizrahi et al. | 385/37 X |
| 5,327,515 | 7/1994 | Anderson et al. | 385/123 |
| 5,337,382 | 8/1994 | Mizrahi | 385/37 |
| 5,351,321 | 9/1994 | Snitzer et al. | 385/37 X |
| 5,367,588 | 11/1994 | Hill et al. | 385/37 |
| 5,377,288 | 12/1994 | Kashyap et al. | 385/37 |
| 5,377,291 | 12/1994 | Hatakoshi et al. | 385/122 |
| 5,388,173 | 2/1995 | Glenn | 385/37 |
| 5,420,947 | 5/1995 | Li et al. | 385/37 |
| 5,550,654 | 8/1996 | Erdoggan et al. | 385/4 |

OTHER PUBLICATIONS

H. Kogelnik, "Filter Response of Nonuniform Almost–Periodic Structures", The Bell System Technical Journal, Jan. 1976, pp. 109–127 (no date).

LaRochelle et al., "Photosensitive Optical Fibers Used As Vibration Sensors", 1990 Optical Society of American, pp. 399–401 (no date).

Hill et al., "Photosensitivity In Optical Fiber Waveguides: Application To Reflection Filter Fabrication", 1978 American Institute of Physics, pp. 647–649 (no date).

*Primary Examiner*—Akm E. Ullah
*Attorney, Agent, or Firm*—Edward F. Murphy

[57] ABSTRACT

Fiber Bragg gratings of low reflectivity are given a squared reflectivity function in the form of a tophat configuration having a flat top and lacking undesirable side lobes. Such a reflectivity function for a fiber Bragg grating is achieved by interfering a diffracted beam with a plane wavefront beam so as to impose a sinc function on the resulting interference pattern that imprints the grating on an optical fiber.

23 Claims, 9 Drawing Sheets

Grating envelope: 6 lobes on each side of central peak

FIG.9

Grating envelope: 12 lobes on each side of central peak

FIG.10

6 lobes, delta n= 0.0005

FIG.11

6 lobes, delta n= 0.001

FIG.12

6 lobes, delta n = 0.002

FIG.13

6 lobes, delta n = 0.005

5,668,901

LOW REFLECTIVITY FIBER BRAGG GRATING WITH RECTANGULAR REFLECTION FUNCTION

FIELD OF THE INVENTION

The invention occurs in the field of fiber Bragg gratings formed in optical waveguides by exposing a photosensitive waveguide core to an interference pattern formed by overlapping beams of actinic radiation.

BACKGROUND

Fiber Bragg gratings for reflecting (or transmitting) wavelengths of light within optical waveguides are known to have reflectance functions that suffer from undesirable side lobes when the grating has a constant coupling strength along its length. Such side lobes are especially undesirable for narrow band and dense wavelength division multiplexing. Problems with such side lobes and attempts at eliminating such side lobes have been discussed in U.S. Pat. Nos. 5,309,260 and 5,388,173, for example.

For many purposes, the optimum reflectance function for a fiber Bragg grating is a three-sided rectangle, with a flat top and nearly vertical sides in a "tophat" configuration. Prior art suggestions for different ways of making fiber Bragg gratings have so far failed to achieve this.

SUMMARY OF THE INVENTION

For low reflectivity gratings, the desired tophat configuration for the reflectivity function of a fiber Bragg grating can be closely approximated by making the envelope function of the grating a sinc function. A sinc function for the envelope function of the grating can be achieved by interfering two angled writing beams, one of which has a plane wavefront and another of which is diffracted. The diffracted beam is preferably diffracted through a slit oriented transverse to the fiber and then propagated to the far field where it interferes with a plane wavefront beam in an interference pattern incident on the fiber core. The plane wavefront beam is preferably at least twice the intensity of the diffracted beam. This way of imposing a sinc function on the envelope function of the grating causes the grating phase to change by $\pi$ every time the sinc function passes through zero, which helps the reflectivity function of the grating approximate the desired tophat configuration.

DETAILED DESCRIPTION

This invention arises from the discovery that a sinc function imposed on the grating envelope of a fiber Bragg grating allows the spectral reflectivity function of the grating to approach a desired tophat configuration, with nearly vertical sides and a flat top. It also involves recognition of a simple and effective way that such a sinc function can be imposed on the grating envelope to achieve the desired tophat reflectivity. A way of making the inventive grating will be described first. Then, the reflectivity characteristics of the inventive grating and the underlying mathematics will be explained.

To form a fiber Bragg grating with a spectral reflectivity in a tophat shape, two angled beams of actinic radiation are overlapped in an interference pattern incident on a photosensitive waveguide. One of the beams preferably has a plane wavefront, and the other beam is preferably diffracted to impose a sinc function on the interference pattern that defines the grating envelope. Much of the technology for accomplishing this is well understood in the art. Photosensitive cores for waveguides such as optical fibers can be made so that their index of refraction is varied in response to a pattern of actinic radiation, such as UV light. The time and intensity of the exposure, and the configuration of the interference pattern, determine the pattern of index variation imprinted on the fiber core by the writing beams. Various beam arrangements and pattern configurations for forming fiber Bragg gratings have been suggested.

Figure 1:
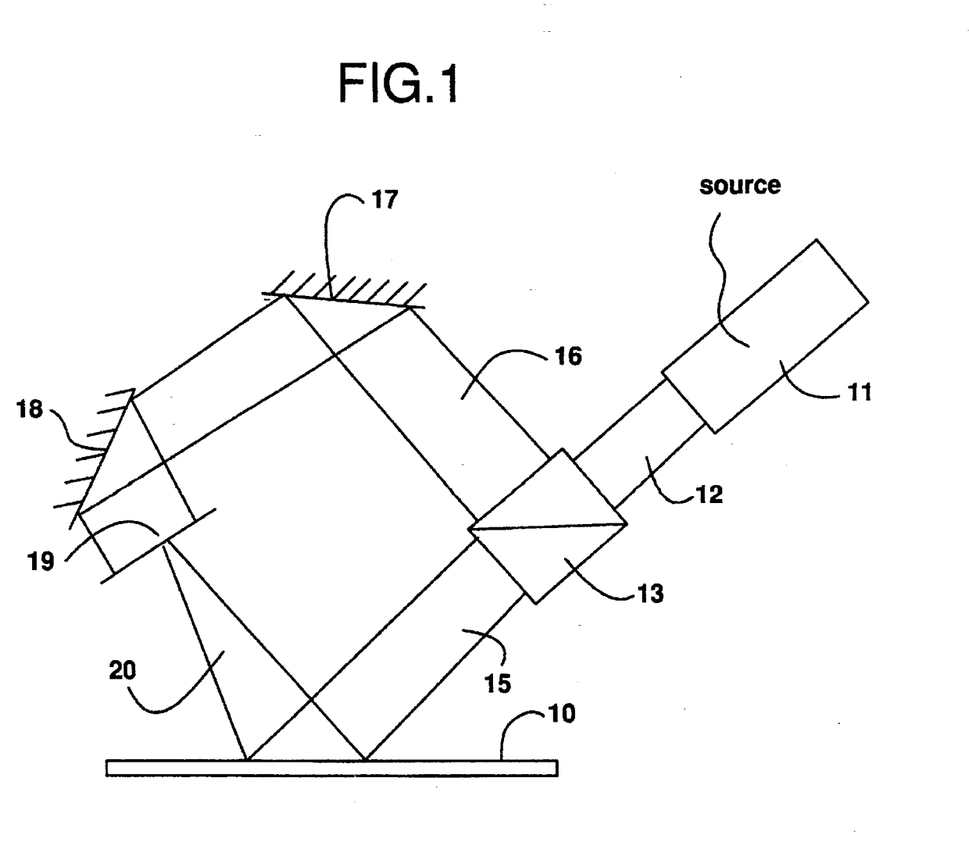
FIG. 1 is a schematic view of a preferred arrangement of overlapping, actinic writing beams interfered in a pattern to form a grating on an optical fiber.

In the preferred arrangement of FIG. 1, a fiber 10 having a photosensitive core is imprinted with a grating pattern corresponding to the interference of a pair of overlapping beams 15 and 20. These are preferably derived from a single source 11 of actinic radiation, such as UV light. A beam 12 from source 11 is divided by beamsplitter 13 into a primary beam 15 and a secondary beam 16. Primary beam 15 preferably has a plane wavefront, and optical elements that are not shown in FIG. 1 can be used to accomplish this.

Secondary beam 16 is directed by mirrors 17 and 18 to an orientation angled relative to primary beam 15. Then, beam 16 is directed by mirror 18 through a narrow diffraction slit 19 oriented transversely or perpendicular to fiber 10. Beam 20 passing through slit 19 is diffracted and propagated to the far field where it interferes with primary beam 15 in overlapping incidence on fiber 10.

Diffracted beam 20 imposes the desired sinc function on the interference pattern created with beam 15. This in turn imposes the sinc function on the envelope function of the grating's pattern of varying index of refraction as imprinted in fiber 10. This changes the phase of the grating by $\pi$ every time the sinc function passes through zero, and it gives the grating a reflectivity function in the desired tophat form. As explained below, the Fourier transform of a reflectivity function in the desired tophat shape is a sinc function, which the diffracted beam imposes on the grating envelope for a low reflectance grating.

Figure 2:
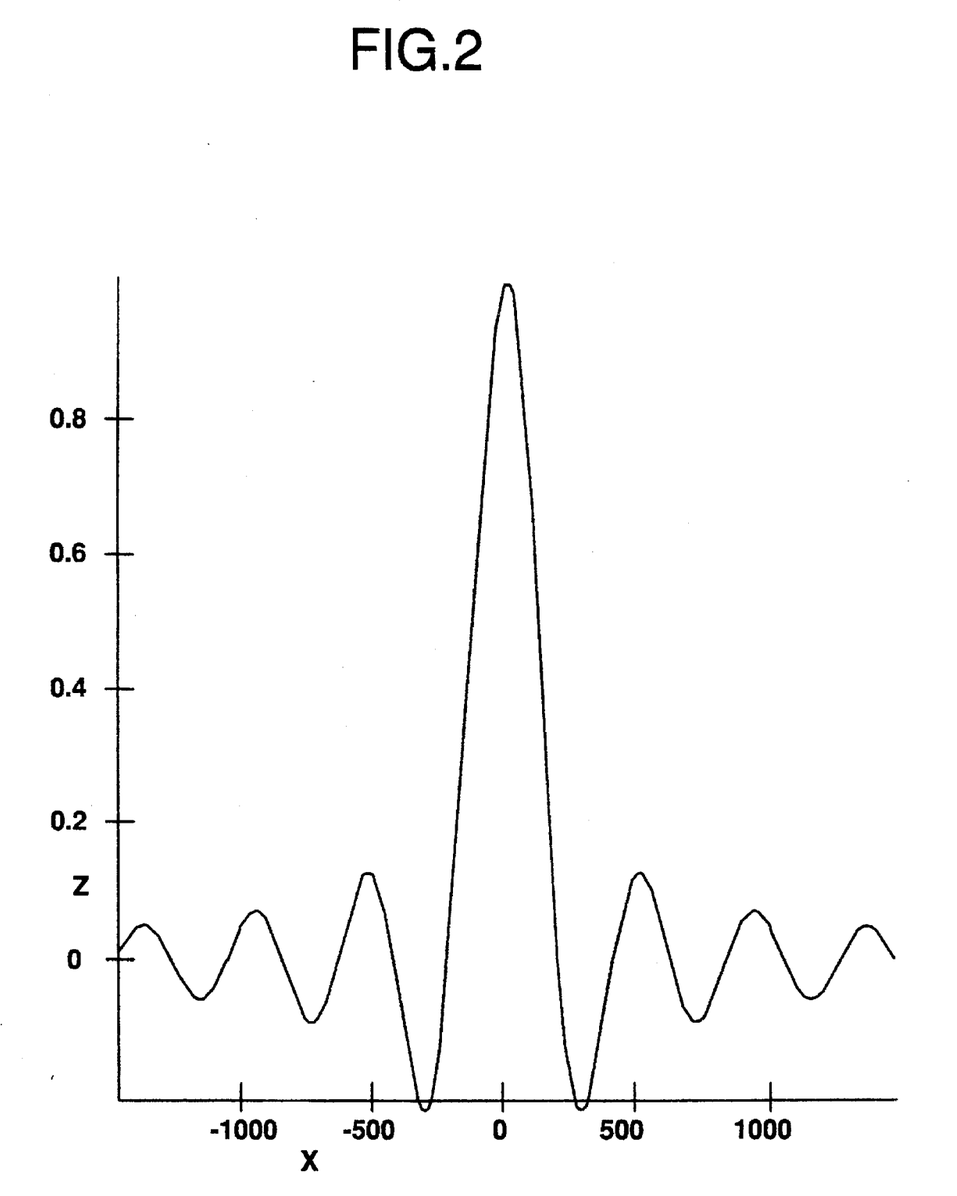
FIG. 2 graphically represents a sinc function shown as the amplitude of the diffracted beam in the arrangement of FIG. 1.

FIG. 2 shows the sinc function form of the amplitude of diffracted beam 20. Diminishing side lobes appear on each side of a central amplitude peak, and the amplitude passes through zero twice for each side lobe.

Figure 3:
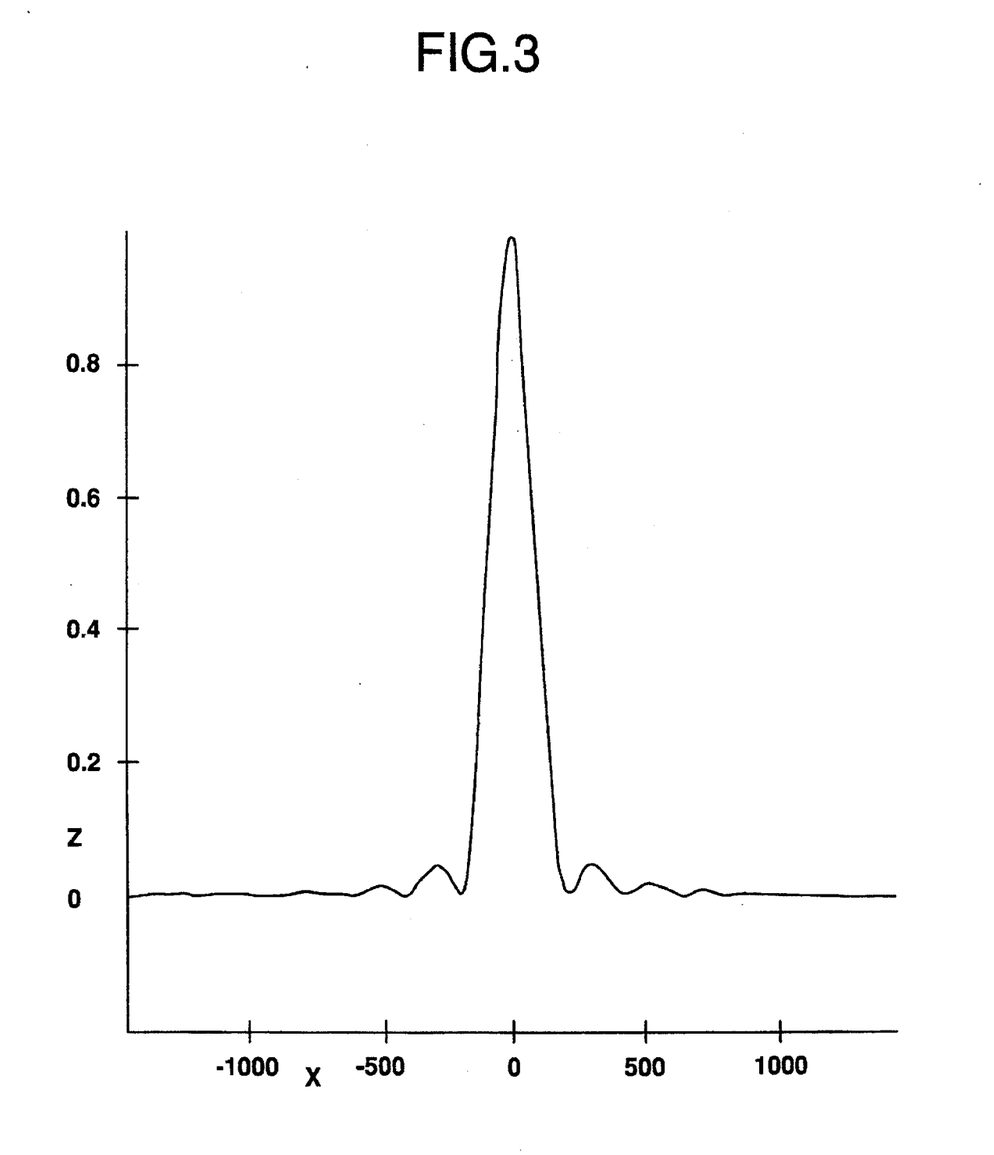
FIG. 3 graphically represents the intensity of the sinc function beam of FIG. 2.

The intensity of the sinc function beam 20 is shown in FIG. 3 and is obtained by squaring the amplitude of FIG. 2. The intensity is a measurable quantity.

Figure 4:
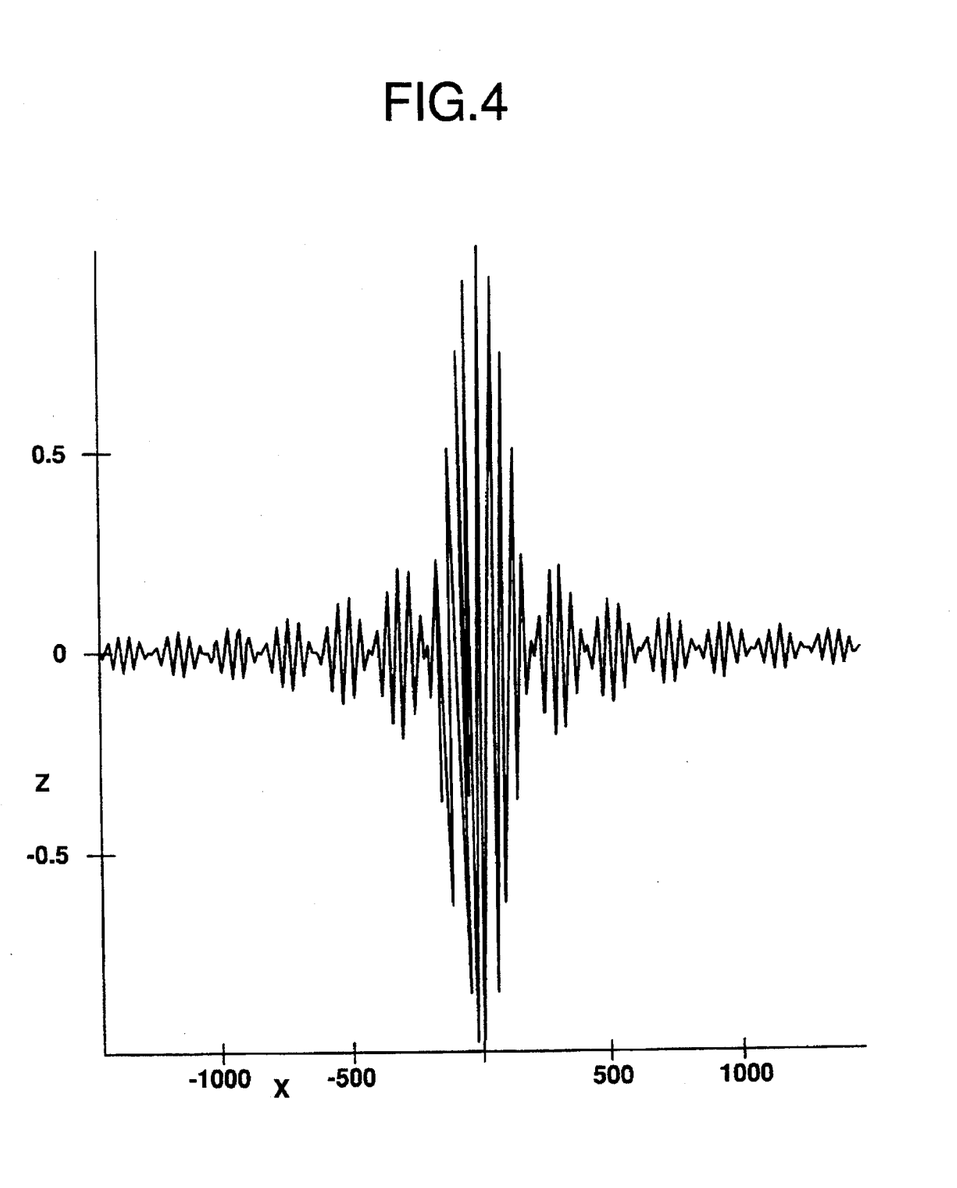
FIG. 4 graphically represents the resultant amplitude of the interference of the diffracted beam and the plane wave beam of FIG. 1.

The amplitude that results when diffracted beam 20 interferes with plane wave beam 15 at fiber 10 is shown in FIG. 4. This also shows the $\pi$ phase change at each zero crossing.

Figure 5:
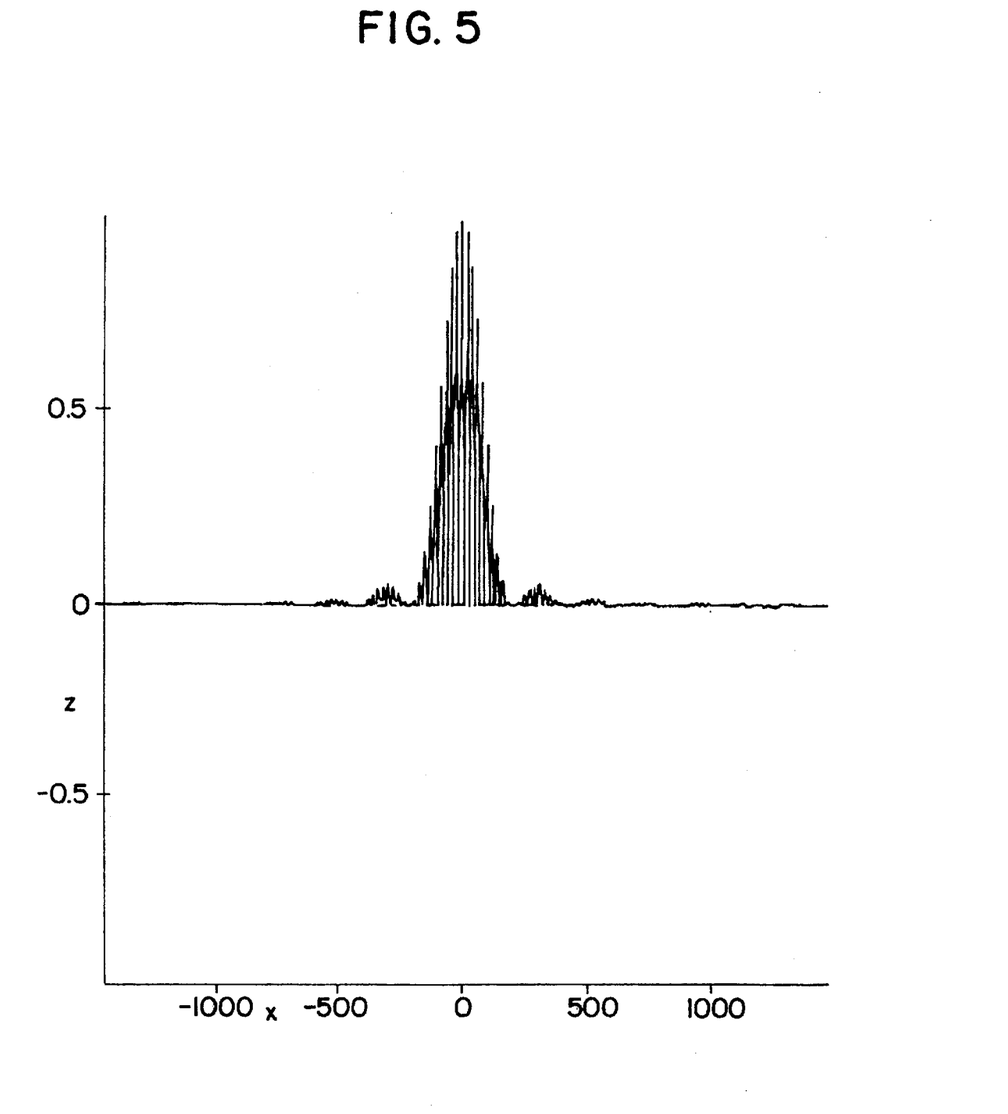
FIG. 5 graphically represents the intensity of the interference pattern of the overlapping beams of FIG. 1.

The intensity of the interference pattern formed by overlapping beams 15 and 20 is shown in FIG. 5. This intensity is obtained by squaring the data of FIG. 4, and it corresponds to the changes in the index of refraction of the interference pattern imprinted on fiber 10. The sinc function imposed on this pattern produces the tophat approximation for the reflectivity of the grating.

Figure 6:
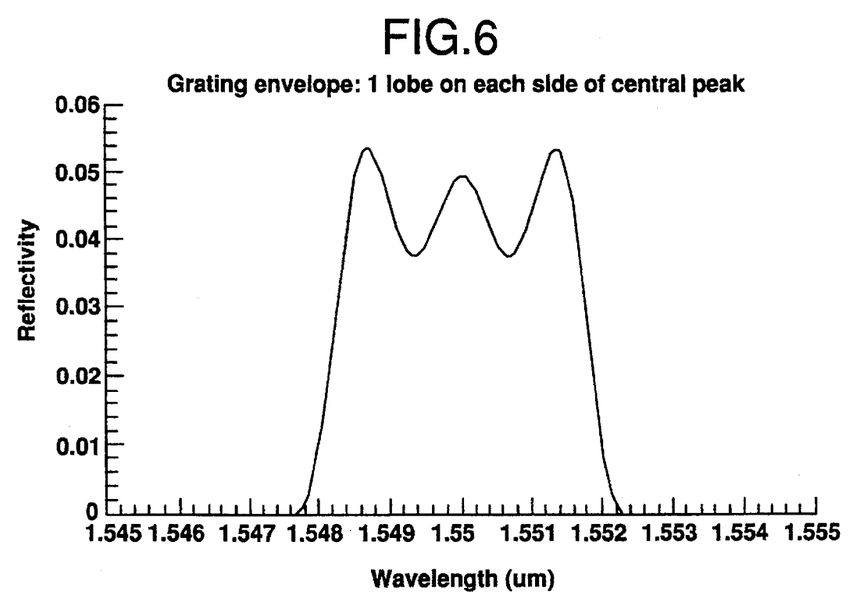
FIGS. 6–11 graphically represent spectral reflectivities of gratings made by using different numbers of lobes on each side of the central peak of the sinc function of FIG. 2.
Figure 7:
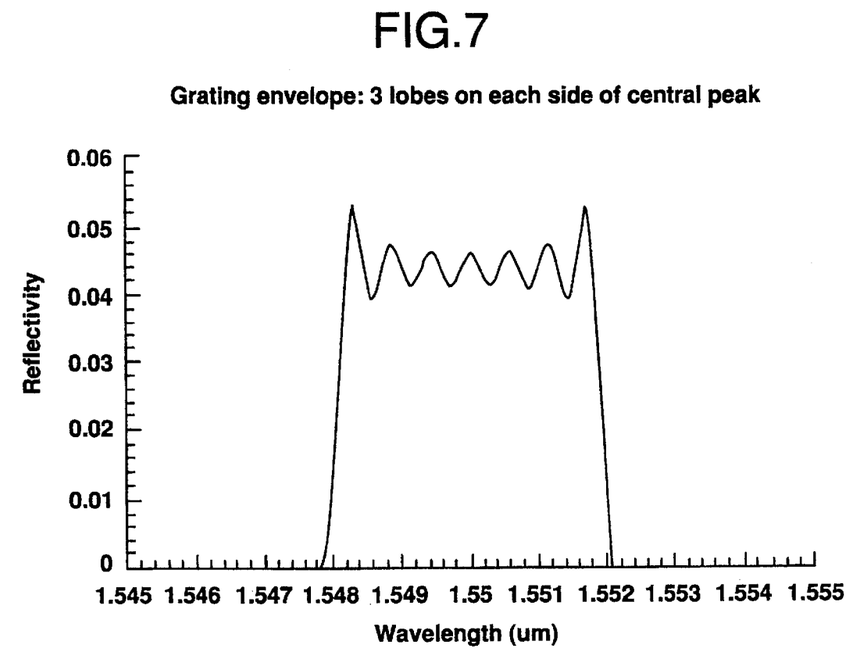
Figure 8:
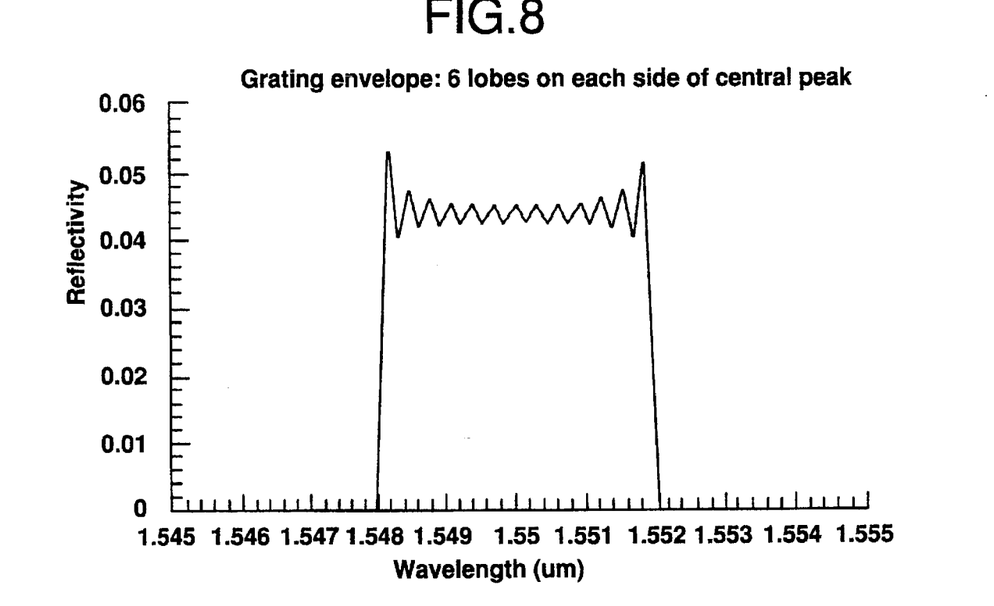
Figure 9:
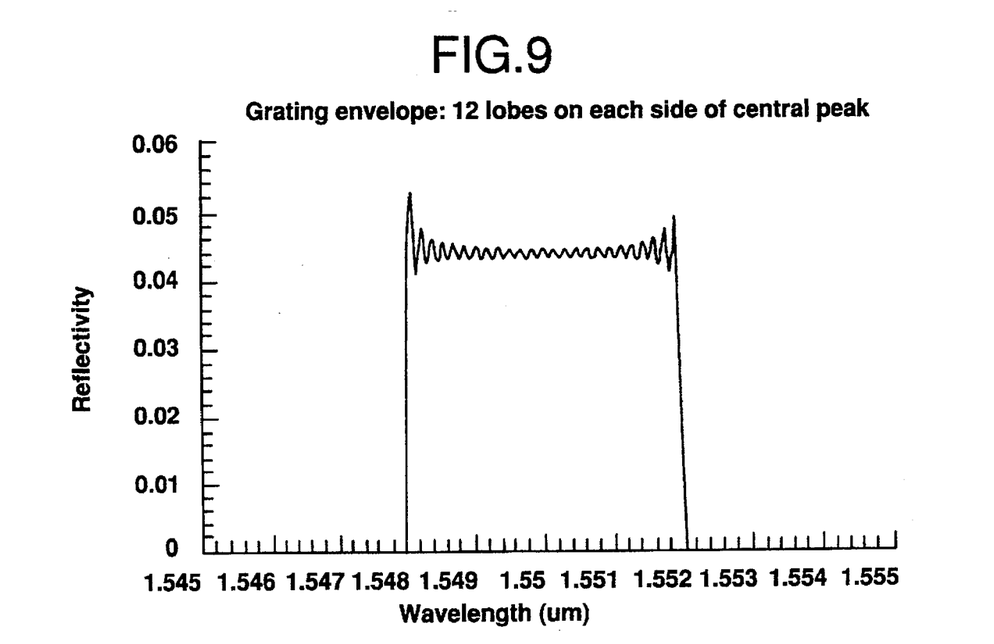

Calculated reflectivities for gratings made with sinc function envelopes as described above are shown in FIGS. 6–13. Different numbers of side lobes of the sinc function of beam 20 can be used by selectively masking the edges of beam 20. The reflectivity resulting from use of a single side lobe on each side of the central peak of the sinc function of FIG. 2 is shown in FIG. 6. The sides of the reflectivity function have noticeable slopes, and the top is not ideally flat. Increasing the number of side lobes of the sinc function to three lobes on each side of the central peak produces the improved reflectivity shown in FIG. 7. Successively closer approximations to the desired tophat configuration can be achieved by using increasing numbers of side lobes of the sinc function, as is apparent from FIG. 8 showing use of 6 side lobes on each side of a central peak, and from FIG. 9 showing use of 12 sides lobes on each side of a central peak.

FIGS. 10–13 show the calculated reflectivity spectrum effects of increasing reflectivity of the grating. The reflectivity is increased by increasing delta n which can be done by increasing the time and/or intensity of the exposure of fiber 10 to actinic light. The calculations for FIGS. 10–13 use six lobes on each side of a central peak for the sinc function. They show a good approximation to a tophat configuration for low reflectivities such as about 7 percent in FIG. 10, about 18 percent in FIG. 11, and about 50 percent in FIG. 12. At higher reflectivities, the desired tophat shape for the reflectivity spectrum begins to deteriorate. A 90 percent reflectivity, as shown for example in FIG. 13, has noticeably sloping sides.

The mathematics behind the graphic representations of FIGS. 2–13 are as follows:

The index distribution, n, for a fiber phase grating is expressible as:

$$n = n_{co} + \Delta n[1 + f(z)\cos(Kz)]$$

where: $n_{co}$ is a refractive index of a core of the grating,
$\Delta n$ is an induced difference in the refractive index of the core,
f(z) is an envelope function of the grating, and $$K = \frac{2\pi}{\Lambda}$$

is a grating wave vector for a grating period $\Lambda$.

Figure 10:
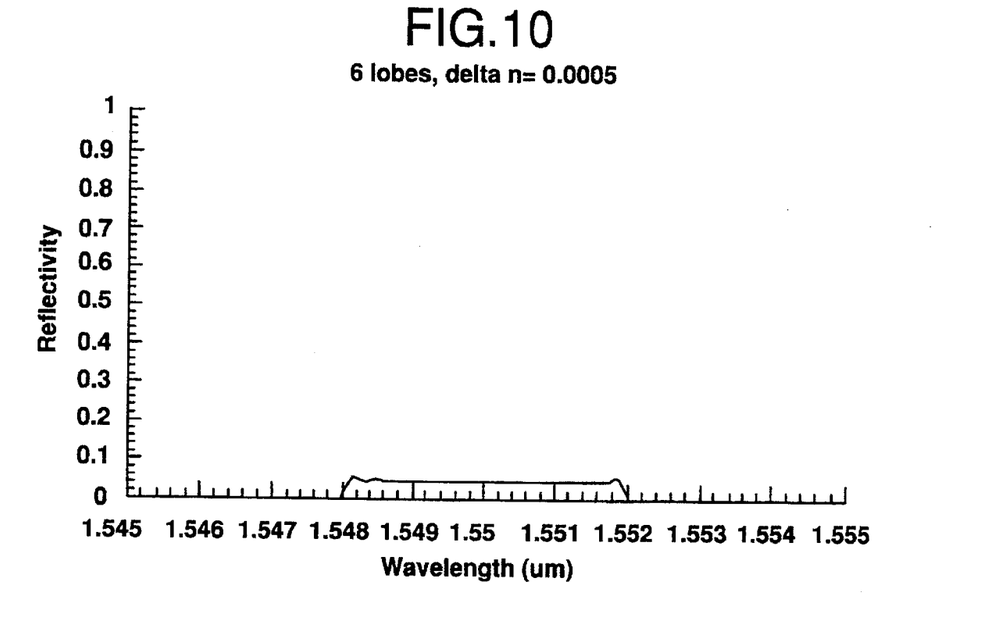
Figure 11:
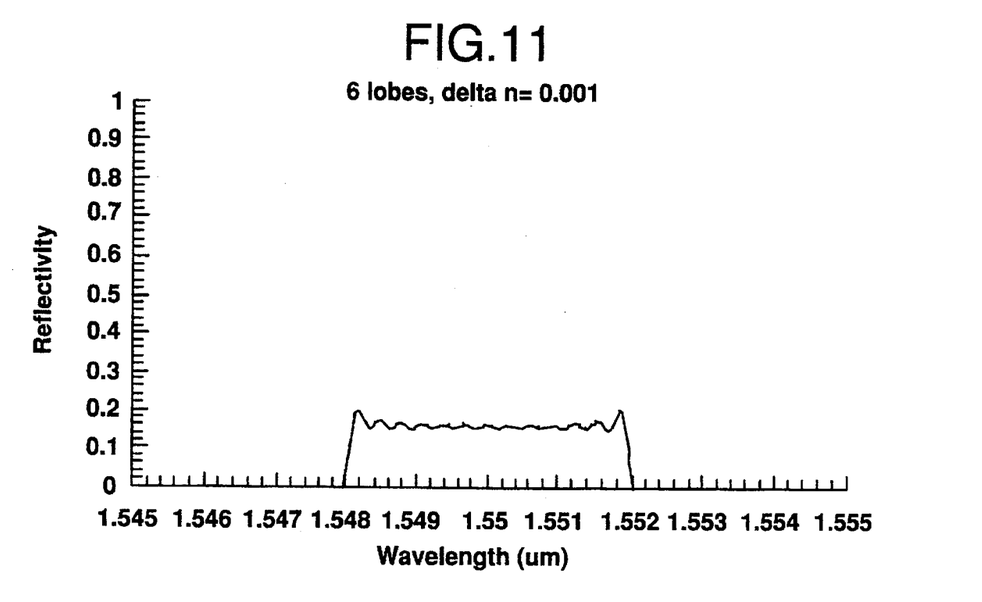
Figure 12:
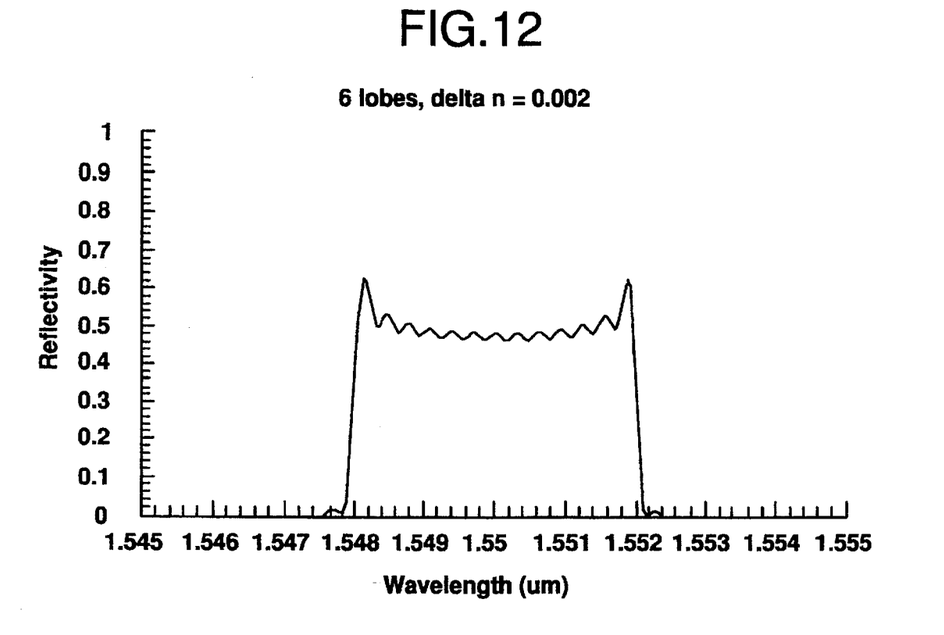
FIGS. 12–13 graphically represent spectral reflectivities of gratings using six lobes of the sinc function of FIG. 2 and using different values for delta n.
Figure 13:
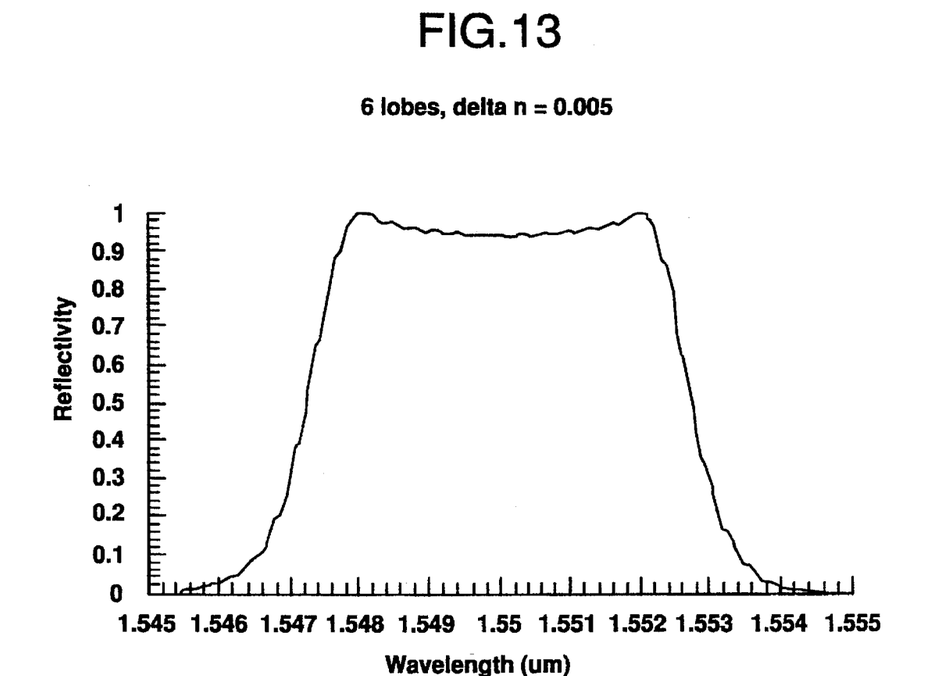

For small reflectivities, of less than about 50 percent reflectivity, as shown in FIGS. 10–12, the reflection function of the grating is the Fourier transform of its envelope function f(z). Since the Fourier transform of the desired rectangular tophat configuration for the reflection function is a sinc function; f(z) is preferably a sinc function to make the grating produce the desired result. Such a sinc function is obtained as previously explained by interfering a plane beam and a diffracted beam, and preferably a diffracted beam that is diffracted through a narrow slit oriented transversely to a fiber being imprinted.

The length of each grating is preferably at least one centimeter so that the sinc function is not unnecessarily truncated. Gratings performing according to the calculated graphic results of FIGS. 6–12 can be achieved with the following typical parameters:

Length $\geq 1$ cm
$n_{co} = 1.444$
$\Lambda = 0.5365$ mm
$\Delta n = 0.0005$ $$f(z) = \operatorname{sinc}(Az) = \frac{\sin(Az)}{(Az)}$$

with A=0.015

The term A is related to the spectral width of the reflection spectrum, $\Delta\lambda$, by:

$$\Delta\lambda \equiv \frac{A\lambda^2}{2\pi n}$$

where $\lambda$ is the center wavelength of the filter and n is the effective index of the waveguide.

The diffracted beam 20 is preferably propagated to the far field before interfering with plane wavefront beam 15, and the far field is given as:

$$\left[z \gg \left(\frac{\pi}{\lambda}\right)\right] r^2$$

where:
z is the distance from the aperture to the interference plane,
$\lambda$ is the wavelength of the light, and
r is the width of the diffraction slit.

The angle between the two beams 15 and 20 is selected to obtain the desired center wavelength (Bragg matched wavelength) of the grating. This angle is affected by the wavelength of the beams, which is typically 240 nanometers.

$$\text{Bragg wavelength} = \frac{2 n_{co} \lambda}{2 \sin \text{theta}}$$

where theta is the half-angle between the writing beams.

This yields values for angles between the writing beams of typically 26 degrees, and such angles are preferably variable so that gratings can be imprinted with the desired center wavelength for the reflectivity function.

The plane wave beam 15 preferably has at least twice the amplitude of the diffracted beam 20. A more intense plane beam 15 improves the approximation of the grating's reflectivity function to the desired tophat form.

There may be other ways of diffracting beam 20 to give it a sinc function form. Edge diffraction is one possibility.

We claim:

1. A fiber Bragg grating having a core patterned with a varied index of refraction corresponding to varied intensities of an interference pattern of actinic radiation incident on the fiber core from interference of a plane wavefront beam and a diffracted beam.

2. The grating of claim 1 wherein the reflectivity, of the grating is up to about 50 percent.

3. The grating of claim 1 wherein the length of the grating is at least one centimeter.

4. The grating of claim 1 wherein the diffracted beam is diffracted through a slit oriented transverse to the fiber.

5. The grating of claim 1 wherein the beams are derived from a single source.

6. The grating of claim 1 wherein the angle between the beams is selected to obtain a desired center wavelength of reflection of the grating.

7. The grating of claim 1 wherein the plane wavefront beam has at least twice the intensity of the diffracted beam.

8. The grating of claim 1 wherein the diffracted beam is arranged to apply a sinc function to the envelope function of the grating.

9. A method of making a fiber Bragg grating having a core patterned with a varied index of refraction, said method comprising:

a. providing a fiber having a core that can be patterned by actinic radiation;

b. arranging angled beams of actinic radiation to form an interference pattern incident on the fiber core;

c. arranging a first one of the beams to have a plane wavefront; and d. arranging a second one of the beams to be diffracted.

10. The method of claim 9 including arranging the interference pattern to extend over at least one centimeter of the length of the fiber core.

11. The method of claim 9 including diffracting the second beam through a slit transverse to the fiber.

12. The method of claim 9 including arranging the plane wave beam to have at least twice the intensity of the diffracted, beam.

13. The method of claim 9 including arranging an angle between the beams to obtain a desired center wavelength of reflection of the grating.

14. The method of claim 9 including deriving the beams from a single source.

15. The method of claim 9 including diffracting the second beam to apply a sinc function to the envelope function of the grating.

16. A fiber Bragg grating having a refractive index distribution, n, expressible as:

$$n = n_{co} + \Delta n[1 + f(z)\cos(Kz)]$$

where: $n_{co}$ is a refractive index of a core of the grating, $\Delta n$ is an induced difference in the refractive index of the core, f(z) is an envelope function of the grating, and $$K = \frac{2\pi}{\Lambda}$$

is a grating wave vector for a grating period $\Lambda$, the grating comprising: the envelope function f(z) being a sinc function, and the sinc function being obtained by interfering a plane wavefront beam with a diffracted beam.

17. The grating of claim 16 wherein the sinc function is expressed as:

$$f(z) = \operatorname{sinc}(Az) = \frac{\sin(Az)}{(Az)}$$

where: A is related to a spectral width of a reflection spectrum, $\Delta\lambda$, of the grating by:

$$\Delta\lambda \equiv \frac{A\lambda^2}{2\pi n}$$

18. The grating of claim 16 wherein the reflectivity of the grating is up to about 50 percent.

19. The grating of claim 16 wherein the length of the grating is at least one centimeter.

20. The grating of claim 16 wherein the diffracted beam is diffracted through a slit oriented transverse to the fiber.

21. The grating of claim 16 wherein an angle between the plane wavefront beam and the diffracted beam is selected to obtain a desired center wavelength of reflection of the grating.

22. The grating of claim 16 wherein the plane wavefront beam has at least twice the intensity of the diffracted beam.

23. The grating of claim 16 wherein the plane wavefront beam and the diffracted beam are derived from a single source.

* * * * *